United States Patent Office 3,013,016
Patented Dec. 12, 1961

3,013,016
TRIALKYLAMINE BORANES AND THEIR PREPARATION
Hans Haberland and Rüdolf Stroh, Leverkusen-Bayerwerk, Germany, assignors to Farbenfabriken Bayer Aktiengesellschaft, Leverkusen, Germany, a corporation of Germany
No Drawing. Filed May 16, 1958, Ser. No. 735,686
Claims priority, application Germany May 24, 1957
7 Claims. (Cl. 260—313)

This invention relates to amine-boranes and more particularly to trialkylamine boranes.

It is known that one can obtain alkylamine boranes by different methods: thus, in Gmelins "Handbuch der Anorganischen Chemie," 8th edition, System No. 13, Bor, Ergänzungsband, page 235, there are described different methods of producing trimethylamine-boranes, but from starting materials which are difficult to obtain, such as from trimethylamine and diborane at $-110°$ C., or by thermal decomposition of beryllium- or aluminum-boronhydride-trimethylamine complexes.

A communication from R. Köster (Angewandte Chemie vol. 69 (1957), page 94) states that amine-boranes of this type are obtained from boron alkylene compounds by catalytic hydration under pressure in the presence of tertiary amines. In this way, triethylamine borane, diethyl-n-butylamine borane and tri-n-butylamine borane were obtained. Although this method appears at first to be so simple it is, nevertheless, laborious and technically difficult to apply since the boron alkyls must be produced via the aluminum alkyls. The process of G. J. Schaeffer and E. R. Anderson (Journal of the Chemical Society, vol. 71 (1949), page 2143 seq.) is considerably simpler: trimethylamine borane is produced from trimethylamine hydrochloride and lithium borohydride in ether. Due to the apparent sensitivity of the boron-nitrogen compounds to air and moisture, it is especially important to provide absolutely water-free conditions.

It is an object of the present invention to provide a novel process for the production of trialkylamine boranes. It is a further object to provide a very simple, economic process for the production of trialkylamine borane. Further objects will appear hereinafter.

It has now been found that trialkylamine boranes can be obtained if tertiary amines are reacted with borohydrides in aqueous solution in the presence of inert organic solvents which are immiscible or only partially miscible with water. Suitably tertiary amines are, for example, aliphatic or cycloaliphatic amines, such as, for example, trimethylamine, triethylamine, tripropylamine, dimethylcyclohexylamine, diethylcyclohexylamine or dimethyloctadecylamine.

The tertiary amines used for the process according to the invention can be used as free bases or in a form of their salts. If the free bases are used then an acid, such as dilute hydrochloric acid, phosphoric acid, formic acid, toluene sulfonic acid, acetic acid or boric acid, is added during the reaction or carbon dioxide is passed into the aqueous borohydride solution. Instead of the pure amines, aqueous solutions of the tertiary amines can also be used.

The borohydrides used for the new process can be obtained by known processes, for example, by the process of Belgian specification No. 563,447 (now Belgian Patent 563,447, published on April 16, 1958), from a metaborate and a metal hydride, such as, for example, calcium hydride. In this case, it is not necessary to use the pure borohydride but the unrefined, crude products, such as are obtained by the process of Belgian specification No. 563,447 can be used. The impurities remain in the aqueous phase in the subsequent reaction according to the invention and, therefore, do not interfere. Instead of the solid borohydride, aqueous solutions can also be used.

The process according to the invention is advantageously carried out at reduced temperatures in the region short above $0°$ C. e.g. between $0-30°$ C. especially $0-15°$ C. Nevertheless, higher temperatures can also be used, but then in general a lower yield is obtained. Suitable inert organic solvents which are immiscible or only partially miscible with water are, for example, benzene, toluene, xylene, ether, aliphatic hydrocarbons etc., which for example, can be used in an amount 2–20 times, but preferably 3–10 times the amount of the borohydride used. However, other amounts can also be used.

The following examples further illustrate the invention without in any way limiting it thereto.

*Example 1*

26.4 parts by weight potassium borohydride are dissolved in 200 parts by weight water and 55 parts by weight triethylamine and 200 parts by weight benzene or petroleum ether are added thereto. Carbon dioxide is passed in at $0-2°$ C. with stirring so that the two phases are well mixed. After a short time, the evolution of hydrogen commences and is finished after about 7–8 hours. The benzene layer is separated off, the aqueous layer washed with benzene and the solvent distilled off. The residue is distilled in a vacuum.

49 parts by weight of pure triethylamine borane with a boiling point of $96-97°$ C./12 mm./Hg are obtained. The yield amounts to 85% of theory.

Instead of the above-used potassium borohydride, the corresponding amount of crude borohydride containing about 15% natrium borohydride or an aqueous extract of this crude sodium borohydride can be used.

*Example 2*

100 parts by weight of an aqueous solution of trimethylamine, which contains 45 parts by weight trimethylamine, are mixed with 100 parts by weight water and 27 parts by weight potassium borohydride added thereto. 200 parts of diethyl-ether were then added. Carbon dioxide was passed in with good mixing together of the two phases. The evolution of hydrogen, which commences immediately, ceases after about 3 hours. The ethereal solution is then separated off, the aqueous phase washed with ether and the ether removed by distillation. 29 parts by weight trimethylamine borane remain behind as distillation residue. Yield 79.5% of theory.

*Analysis.*—$C_3H_{12}NB$ (M.W. 72.98). Calculated: 49.35% C, 16.61% H, 19.20% N. Found: 49.15% C, 16.31% H, 20.90% N.

The product is in a form of needles which are easily soluble in ether and benzene, soluble with difficulty in ligroin and insoluble in water. By the saponification test in benzene-water solution 6.7% of the trimethylamine borane introduced is saponified after 70 hours.

*Example 3*

27 parts by weight potassium borohydride are dissolved in 200 parts by weight water and mixed with 77 parts by weight tri-n-propylamine and 200 parts by weight diethyl ether. Carbon dioxide is passed in at $0°$ C. with good mixing together until the evolution of hydrogen, which initially is very vigorous, is almost finished, this taking 1–2 hours. By working up by distillation, 55 parts by weight tri-n-propylamine borane with a boiling point of $116-118°$ C./10 mm./Hg are obtained. Yield: 70% of the theory, calculated on the amount of borohydride used.

Tri-n-propylamine borane is easily soluble in benzene, ether and petroleum ether and is insoluble in water. The saponification test gives a 1% saponification in 70 hours.

Example 4

27 parts by weight potassium borohydride dissolved in 200 parts by weight of ether are treated with 200 parts by weight of ether and 70 parts by weight of hexahydrodimethyl aniline.

Carbon dioxide is passed in with good stirring by means of a vibration mixture. The reaction is finished after 1½ hours. By working up by distillation there is obtained dimethyl-cyclohexylamine borane, boiling at 130–132° C./11 mm. Hg. Yield: 55.5 parts by weight or 79% of the theory. Melting point: 42–44° C.

*Analysis.*—Dimethyl-cyclohexylamine borane $C_8H_{20}NB$ (molecular weight: 141.03). Calculated: 68.09% C; 14.33% H; 9.94% N. Found: 68.63% C; 14.26% H; 9.63% N.

Example 5

Using the process described in Example 4, there is obtained from 50 parts by weight N-methylpyrrolidine and 27 parts by weight potassium borohydride in water and ether, carbon dioxide being passed through, 27.2 parts by weight N-methylpyrrolidine borane. Yield: 55% of theory; boiling point 96° C./12 mm. Hg.

Example 6

If, in the process according to Example 1, there is used, instead of benzene, the same amount of diisopropyl ether or the same amount of a xylene, then triethylamine borane is obtained in a yield of 81.4% of theory.

Example 7

27 parts by weight potassium borohydride are dissolved in 200 parts by weight water and mixed with 70 parts by weight triethylamine. With good stirring there is added dropwise at 0–5° C. in a course of 7 hours, an aqueous boric acid solution which contains 10.3 parts by weight boric acid. The ethereal layer is then worked up by distillation and yields 39.7 parts by weight triethylamine borane. Boiling point 96° C./12 mm. Hg. Yield 69%.

Example 8

23 parts by weight triethylamine and 11.7 parts by weight potassium borohydride are introduced into a mixture of 150 parts water and 150 parts ether. 65 parts by volume dilute acetic acid, which contain 13 parts by weight glacial acidic acid, are added dropwise with good stirring in 90 minutes at 10° C. Working up yields 11 parts by weight triethylamine borane with a boiling point of 96° C./12 mm. Hg. Yield: 44% of the theory.

Instead of the acetic acid there can be used also hydrochloric acid, phosphoric acid, formic acid or toluene sulfonic acid.

Example 9

19 parts by weight sodium borohydride are dissolved in 200 parts by weight water and mixed with 200 parts by weight diethyl ether and 70 parts by weight triethylamine. Carbon dioxide is passed in with good stirring. The reaction is finished after 4 hours. The reaction mixture is then worked up by distillation and there are obtained 45.6 parts by weight triethylamine borane, boiling point 96° C./12 mm. Hg. Yield: 79.3% of the theory.

A carburetor engine is operated for 25 hours with a fuel containing 0.05% by volume of lead-tetraethyl, 2 parts by volume of monomethylaniline and 0.05 part by volume of triethylamine borane. After that time, 20% only of the inside walls of the piston are covered with a very thin layer, while the inside walls of the piston of an engine operated under comparable conditions without the addition of triethylamine borane, are covered with a relatively thick resinous layer to 47%.

Example 10

8.5 parts by weight of sodium borohydride are dissolved in 100 parts by weight of water and covered with a layer of 100 parts by weight of ether. 72.8 parts by weight of dimethyl-octadecylamine are added thereto, the mixture is cooled to 0–5° C. and carbon dioxide passed in with good stirring. After about 15 minutes, the evolution of hydrogen commences and is terminated after 2–2½ hours. The ethereal solution is separated off and the aqueous layer shaken up several times with ether. The ether is distilled off and the distillation residue recrystallized from ligroin. 21 parts by weight of dimethyl-octadecylamine borane are obtained with a melting point of 55–57° C.

*Analysis.*—$C_{20}H_{46}NB$ (molecular weight 311.3). Calculated: 4.50% N; 3.48% B. Found: 4.49% N; 3.60% B.

Example 11

A solution of 100 parts by weight of dimethylaminopropyl-dithio carbamic acid ethyl ester of the formula

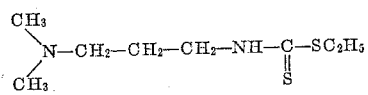

in 200 parts by volume of ether is treated with a solution of 20 parts by weight of sodium borohydride in 200 parts by volume of water. 50 parts by weight of carbon dioxide are introduced over a period of 2 hours at 20–25° C. while stirring. Stirring is continued for 1 hour, the ethereal layer is separated, dried with sodium sulfate and the ether distilled off. 95 parts by weight of dimethyl-propyl-dithiocarbamic acid ethyl ester amine-borane are recovered as light yellow oil which does not distil.

We claim:

1. A process for the production of a tertiary alkylamine borane which comprises reacting at a temperature of from 0–30° C. 0.9–1.5 mols of a tertiary amine selected from the group consisting of trialkyl amines having at most 18 carbon atoms per alkyl radical, N-methylpyrrolidine and dimethylaminopropyldithiocarbamic acid ethyl ester with one mole of a borohydride selected from the group consisting of sodium borohydride and potassium borohydride in the presence of a solvent selected from the group consisting of water-immiscible inert organic solvents and partially water-immiscible inert organic solvents and in the presence of an acid, and then isolating the tertiary alkylamine borane thus formed from the reaction mixture.

2. A process for the production of triethylamine borane which comprises reacting at a temperature of about 0° C. triethylamine and potassium borohydride in an aqueous solution in the presence of a weak acid and benzene, and recovering the triethylamine borane formed.

3. A process for the production of tri-n-propylamine borane which comprises reacting at a temperature of about 0° C. tri-n-propylamine and potassium borohydride in an aqueous solution in the presence of diethyl ether and a weak acid, and recovering the tri-n-propylamine borane formed.

4. A process for the production of dimethyl-cyclohexylamine borane which comprises reacting, at room temperature, dimethyl-hexahydro aniline and potassium borohydride in an aqueous solution and in the presence of ether and a weak acid, and recovering the dimethyl-cyclohexylamine borane formed.

5. A process for the production of methylpyrrolidine borane which comprises reacting at room temperature N-methylpyrrolidine and potassium borohydride in an aqueous solution in the presence of ether and a weak acid, and recovering the methylpyrrolidine borane formed.

6. A process for the production of triethylamine borane which comprises reacting at a temperature of about 10° C., triethylamine and potassium borohydride in an aqueous solution in the presence of ether and with the continuous addition of dilute acetic acid to said solution while stirring, and recovering the triethylamine borane formed by distilling the ethereal layer.

7. Process of claim 1 wherein the acid is continuously added during the reaction.

References Cited in the file of this patent

UNITED STATES PATENTS

| | | |
|---|---|---|
| 2,678,949 | Banus et al. | May 18, 1954 |
| 2,738,369 | Banus et al. | Mar. 13, 1956 |
| 2,860,167 | Brown | Nov. 11, 1958 |
| 2,927,133 | Bragdan | Mar. 1, 1960 |

FOREIGN PATENTS

| | | |
|---|---|---|
| 1,048,586 | Germany | Jan. 15, 1959 |

OTHER REFERENCES

Schaeffer et al.: "Journal of the American Chemical Society," vol. 71, pp. 2143–2145 (1949).

Berg et al.: "Journal of Inorganic and Nuclear Chemistry," vol. 2, pp. 237–45 (1956).

Patterson: "Chemical and Engineering News," vol. 34, No. 6, p. 560 (1956).